Figure 1:
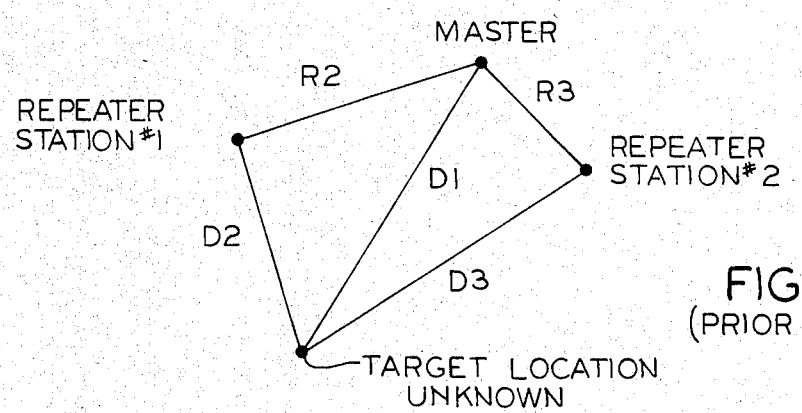

United States Patent [19]

Dano

[11] Patent Number: 4,636,795

[45] Date of Patent: Jan. 13, 1987

[54] RADIO RANGING, NAVIGATION, AND LOCATION SYSTEM WITH CORRECTION FOR SYSTEMATIC ERRORS

[75] Inventor: Paul K. Dano, Euless, Tex.

[73] Assignee: Del Norte Technology, Inc., Euless, Tex.

[21] Appl. No.: 724,393

[22] Filed: Apr. 18, 1985

[51] Int. Cl.[4] .............................................. G01S 1/24
[52] U.S. Cl. .................................... 342/387; 364/452
[58] Field of Search ............... 343/387, 388, 389, 463; 364/452

[56] References Cited

U.S. PATENT DOCUMENTS 4,398,198  8/1983  Dano et al. ..................... 343/387

OTHER PUBLICATIONS

Pages 10–23 of "Radar System Analysis", by David K. Barton.
Pages 135–139 of "A Coincidence Procedure for Signal Detection", by Mischa Schwartz from the IRE Transactions of Dec. 1956.

Primary Examiner—Theodore M. Blum
Attorney, Agent, or Firm—Louis Bernat

[57] ABSTRACT

A radio ranging system has at least one receiver which receives pulses over a direct path and over a longer delayed path from each of two or more fixed repeater stations. From the reception times of pulses which have traveled over these paths at different travel times from the fixed stations, a computer calculates the hyperbolic distances separating the passive receiver and the several fixed reference stations. By interchanging the roles of the various fixed stations, the computer compares the results of timing calculations of the same distances based on the different sets of data. From this comparison, the systematic timing errors of the system can be isolated and added or subtracted from the time measuring results, leaving differential time measurements without systematic error.

18 Claims, 7 Drawing Figures

RADIO RANGING, NAVIGATION, AND LOCATION SYSTEM WITH CORRECTION FOR SYSTEMATIC ERRORS

This invention relates to radio ranging, location, and navigation systems and more particularly to systems for indirectly finding distances which cannot be measured directly, with correction for systematic errors.

Broadly speaking, radio ranging and navigation systems of the described type are at least as old as the LORAN systems which were first introduced sometime around 1950. In general, this kind of radar system uses a master station which sends an interrogation pulse to a distant transponder, which receives it and then transmits a reply pulse. A mobile station receives the reply pulse, and then calculates a position based on the time which elapses between the original master station transmission of the interrogation pulse and its reception of the reply pulse from the transponder. In order to make this calculation, it is necessary to deduct from the total elapsed time, that time period which was required for the transponder to react after it receives the interrogation pulse and before it sends the reply pulse. This transponder reaction time is commonly called the "turn-around time".

One problem is that the turnaround time is a hypothetical average which is put into the calculations, as a mathematical constant, which may or may not be correct insofar as any given transponder is concerned. There is not, in fact, the constant turnaround time which a pure constant represents. Some transponders may turnaround a little faster or slower than others. Thus, the turnaround time that is subtracted from the total elapsed time is only an approximation. The foregoing example of turnaround time is only one of many systematic errors which may occur. In reality, there are many sources of such systematic errors, such as aging components, low power supplies, and the like. This kind of error is compounded in systems which only indirectly measure distances that cannot be read directly.

A system which operates as described thus far is found in U.S. Pat. No. 4,398,198. Another system which is similar, but which uses a different code discipline is found in British Patent No. 1,486,319. Literature on the subject are found in the book "Radar System Analysis" by David K. Barton, published by Airtech House, Inc., 1976, pages 11–17 (Library of Congress No. 76-45811) and "A Coincidence Procedure For Signal Detection", by Mischa Schwartz, IRE Transaction, December 1956, pages 135–139.

Accordingly, an object of this invention is to provide new and improved ranging and directional navigation systems, and especially to systems which indirectly measure distances. Here, an object is to eliminate turn-around time and similar variables from the calculations so that station variations become irrelevant. In particular, an object is to provide a system with shifting modes of operation whereby every station may be either a master or a repeating station, the shifting modes tending to average out the differences in turnaround time, and similar variables.

In keeping with an aspect of the invention, these and other objects are accomplished by providing a radar system which locates the position of a vehicle on a grid, either in the terms of X and Y positions or latitude and longitudinal positions. Several stations are located at fixed and known positions which are separated by known distances previously established by a survey, at the time of installation. Several radio paths exist between each of these fixed stations and a station on a moving vehicle. As the stations shift their roles, systematic variations show up at one time and subtract out at another time. Therefore, any deviations, caused by the differences in the various stations, may be detected and then removed by the use of a computer.

Figure 2:
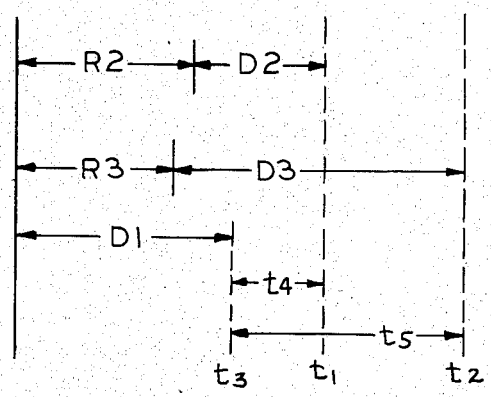
Figure 3:
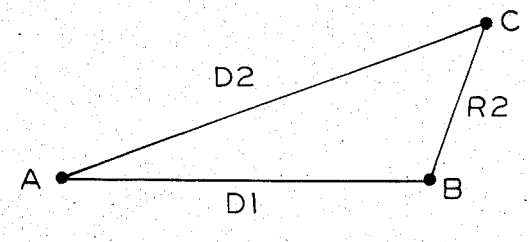
Figure 4:
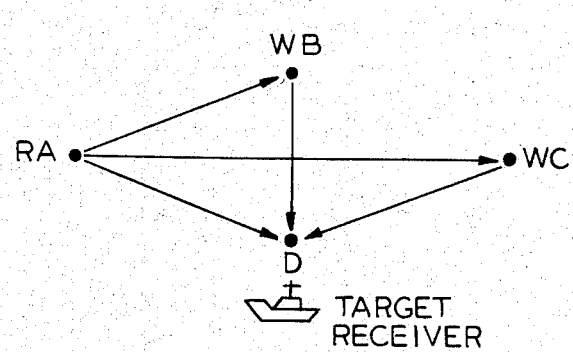
Figure 5:
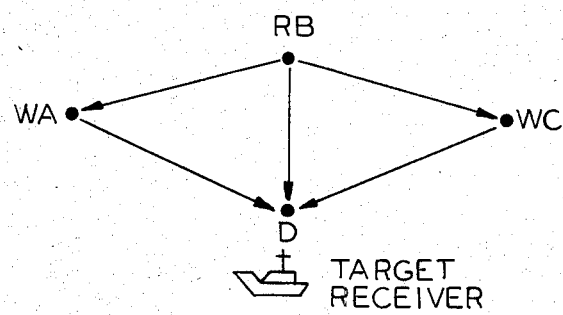
Figure 6:
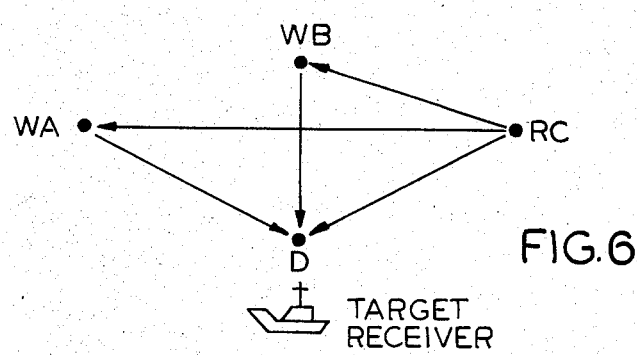
Figure 7:
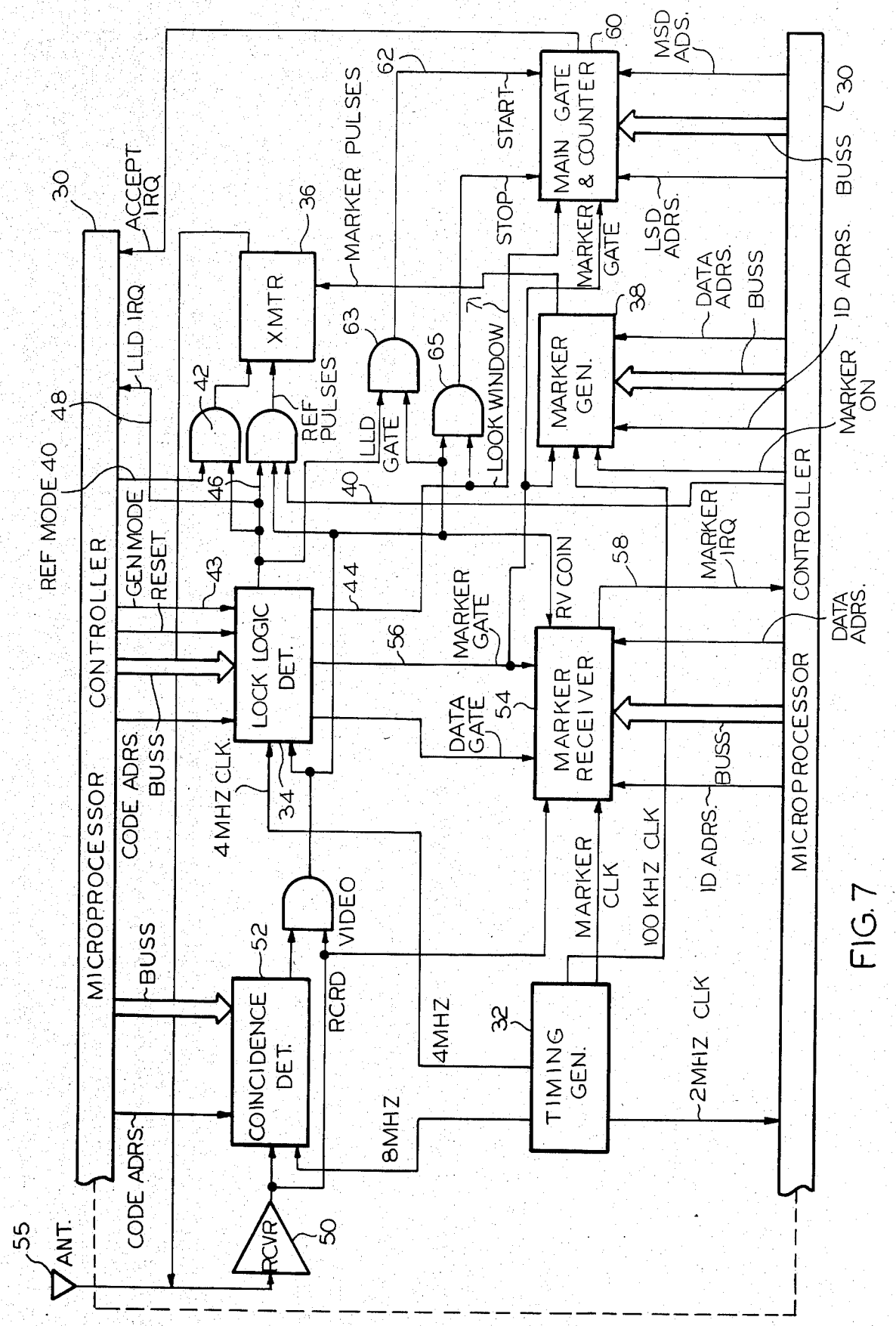

A preferred embodiment is shown in the attached drawings, in which:

FIGS. 1 and 2 are graphical explanations of a prior system, which are more fully explained in U.S. Pat. No. 4,398,198;

FIG. 3 is half of the graphical presentation of FIG. 1, which is useful for giving a generalized statement as to how the inventive system is different from the prior art system of FIGS. 1 and 2;

FIGS. 4–6 graphically illustrate how the inventive system stations shift their modes and roles of operation; and FIG. 7 is a block diagram of the electrical circuits used in each of the stations in the inventive system.

FIG. 1 shows a prior art location system and is taken directly from U.S. Pat. No. 4,398,198. Four stations are shown, which require three different types of equipment and therefore, are expensive custom-made stations. The "master" station can transmit, receive, and act independently, commanding the operations of the remaining stations. The "repeater" stations are a little like a mirror, since they can only reflect the signals which they receive. The target station is a passive device which merely listens to all signals from all stations and uses its computer to calculate the meaning of what it hears in terms of differential time measurements.

This system of FIG. 1 finds a location by comparing the time required to transmit radar pulses over a direct path D1 with the time required to transmit essentially the same radar pulses over longer paths R2+D2 and R3+D3. The first identifiable pulse is received over the shortest and most direct path D1, the receipt of which occurs at time $t_3$ (FIG. 2) and starts the measurement of the two time periods $t_4$, $t_5$. The second path could be either R2+D2 or R3+D3. For path R2+D2, the receipt of a pulse at the time $t_1$ stops time period $t_4$. For the path R3+D3, the receipt of a pulse at time $t_2$ stops the time period $t_5$. From a comparison of the two time periods $t_4$ and $t_5$, a computer at the target station can calculate the various distances and locations.

FIG. 3 is a redrawn half of FIG. 1 with the three stations being designated A, B, and C. It is assumed that all three stations are now identical. Therefore, instead of "Master" and "Repeater", the station which functions as the "Master" in FIG. 1 is now called a "Reference" station and the station which functioned as the "Repeater" is now called a "Wing" station. The distance D1 is assumed to be fixed and known; for example, it may have been measured by surveyors when stations A and B were set up during the original installation of the system.

As with the system of U.S. Pat. No. 4,398,198, all stations transmit and receive on the same frequency. The various stations in the patented system identify themselves by dropping specific ones and retransmitting other of a steady stream of uniformly spaced radar pulses. For example, a station No. 10 could transmit 10 pulses, skip the next, and then transmit 10 more pulses. A simpler station identification scheme is adopted by the present invention. Assume that a station A (FIG. 3)

starts as the reference station and first transmits its marker or identification pulse followed by 200 ranging pulses. After station A has operated for a period as reference, it slips out of the reference mode and into the wing mode while station B becomes the reference. When station B starts as a reference station, it first transmits its marker followed by another 200 ranging pulses. For example, station A may send its marker pulse 30 μsec. early, station B may send its marker pulse 40 μsec. early, etc. Then station C takes over, sends its marker pulse, and the ranging pulses. The advantages are (i) more stations can operate in the system, (ii) the structure of all stations is the same except for minor modifications to make a distinctive marker pulse, and (iii) the target receiver gets many different readings which average to a more accurate reading.

Using the principles of U.S. Pat No. 4,398,198, as explained above in connection with FIGS. 1 and 2, the receiver at station C (FIG. 3), for example, receives a direct signal over path R2 and an indirect signal over path D1+D2. The differential based on the timing explained by FIG. 2 is:

$$T_{(BA)} = D1 + D2 - R2 \quad (1)$$

where $T_{(BA)}$ is the time measurement at the target receiver,
D1 is the travel time between station A and station B,
D2 is the travel time between station A and the target receiver, and
R2 is the travel time between station B and the target receiver.

Next, assume that stations A, B reverse their functions so that station A becomes the reference station and station B becomes the wing station. This time the differential is:

$$T_{(AB)} = D1 + R2 - D2 \quad (2)$$

If the two equations (1) and (2) are added, the results are:

$$T_{(BA)} + T_{(AB)} = 2D1 \quad (3)$$

It should be recalled that the distance D1 was measured at the time when the stations A and B were originally set up. Therefore, the transmission time $T_{(BA)} + T_{(AB)}$ is also known insofar as computing distances is concerned. Here then, we have a known equality which may be used as a baseline for judging the results of the radar system of FIGS. 1 and 2. Therefore, the "target" station of FIG. 1 may take its readings in a normal manner, with the other three stations periodically shifting their roles as reference and wing stations. The computer at the target station can use the "known" distance to periodically check the data being received by comparing the same known results before and after the stations shift their roles. The actual systematic discrepencies of the system are soon discovered, after which a value representing those discrepencies may be calculated. That value then becomes a constant to be subtracted from or added to the various readings. Other random and non-systematic discrepencies tend to average out and do not affect the readings in any substantial manner.

The analysis of the operation of the network of FIG. 3 may be carried forward to a more generalized situation wherein any one of the fixed or shore stations may be either a reference or a wing station. The shifting patterns of transmission are shown in FIGS. 4-6 where the first letter "R" identifies the station acting as the "reference" or master station, and the first letter "W" identifies the station acting as a "wing" or repeater station.

In greater detail, (FIG. 4), reference station A begins master transmission of 150-reference pulses with the first 50-pulses a preamble of suitable marker pulses which identify and indicate its reference function followed by the remaining 100-ranging pulses (the number 150 is only an arbitrary example). Then, the wing stations WB, WC receive and, after a turnaround delay time, repeat the ranging pulses that were received from station A. The target receiver D, receives all of these pulses over the direct path AD and over the two indirect paths ABD and ACD.

After the 150 ranging pulses (in this arbitrary example), station A switches its modes of operation to become a wing or repeater station and station B switches its mode of operation to become the reference or master station (FIG. 5). Station B begins its turn as the reference station by sending its marker pulses which identify and indicate its role. The target receiver D receives the pulses over the three paths BD, BAD, and BCD. After the next 150-reference pulses are sent, station B returns to its role as a wing station and station C takes over as the reference station (FIG. 6). Station C sends its role identifying marker pulses followed by ranging pulses, which the target station D receives over the paths CD, CBD, and CAD.

Thereafter, the system returns to the configuration of FIG. 4, with station A once again serving as the reference station, and the cycle repeats. If there is a random variable, for example a weather related event, on the first cycle, it will have changed on a later cycle. After enough cycles, all of the random variables average out to approximately zero. If there is a systemic variable, say a component has aged in one station and delayed its turnaround time, that variable is always present on every repeated pulse and it does not average out. The inventive system finds these systemic variables by comparing the known distance between two stations with the different apparent distances found by radar, reduces the variable to a mathematical constant, and then subtracts (or adds) that variable from the readings.

For example, from Equation (3), $T_{(AB)} + T_{(BA)} = 2D1 = 2(AB)$, where two readings equate to a known constant value (surveyed distance); $T_{(AB)}$ was measured by the target receiver operating in the mode shown in FIG. 4, while $T_{(BA)}$ was measured by the target receiver operating in the mode shown in FIG. 5. $T_{(AC)} + T_{(CA)} = 2(AC)$, $T_{(BA)} + T_{(AB)} = 2(AB)$ and $T_{(BC)} + T_{(CB)} = 2(BC)$ which is found in a like manner by using the transmitting modes shown in FIGS. 4, 5 and 6.

The networks of FIGS. 4-6 may be expanded to include any suitable number of stations. All stations are identical. All stations transmit on a single frequency. All stations operate completely independent of all other stations. They only have to either identify themselvs as a reference station or recognize and respond to suitable reference signals. If desired, the station identification marker signals may be expanded to include any additional data such as station position, channel assignments, weather reports, navigation hazards, and the like.

FIG. 7 illustrates the electronic equipment for a station operating in any of the three possible modes, since all stations are identical. However, it is noted that the target receiver does not require a transmitter. The microprocessor 30 may have any suitable design and may be controlled by either software or firmware. The timing clock 32 is preferably a counter driven by a crystal controlled oscillator. The lock logic detector 34 and transmitter 36 are substantially the same as corresponding equipment shown in U.S. Pat. No. 4,398,198 and in other patents owned by Del Norte Technology, Inc. of P.O. Box 696 of Euless, Tex., 76039, which manufactures and sells lock logic detector 34, under the commercial model designation "DNTI".

The station of FIG. 7 is controlled by the microprocessor 30. To operate as a reference station, the microprocessor 30 first loads the proper code into the coincidence detector 52 and lock logic detector 34 via the address and data lines. The "AND" gate 42 is conditioned over REF MODE line 40 under the control of the microprocessor. The lock logic detector 34 is placed into the generator mode over GEN MODE line 43 under control of the microprocessor. The pulses from the lock logic detector 34 then are transmitted by transmitter 36 via the antenna 55. The microproessor 30 counts the lock logic detector signals via line lock logic detector IRQ 48 and ascertains when to start the marker generator 38. The marker generator 38 pulses are added to the reference pulses so that the pulses can be identified by the wing and target stations. After the proper number of marker pulses, the marker generator is deactivated.

After all ranging pulses are sent, the reference mode enable signal disappears from REF MODE wire 40 to switch the station from the reference mode to the wing mode of station operation. After the next reference station has counted down and sent the preselected number of ranging pulses, the marker generator 38 in that reference station is triggered to send its closing marker pulse which changes over that station and returns it to the wing mode of operation. When the marker generator 38 in any station sends a closing marker pulse, the next station switches from the wing to the reference mode of operation.

In the wing mode of operation, the station merely acts as a repeater of all ranging pulses received from the reference station. It is only necessary for the station operating in the wing mode to recognize the receipt of a ranging pulse which must be repeated and then to retransmit that pulse. When the system is originally set up, the marker pulse identification codes of the stations requiring the repeating and retransmission of ranging pulses are stored for use when the station is operating in the wing mode. Thus, for example, if the ranging pulses of reference station B are to be repeated, the identification code of station B is stored in station A for its use when it is operating in the wing station mode. If pulses from a station E (not shown), for example, are not to be repeated, the identification code of that station E is not so stored.

The receiver 50 of a wing station receives all signals of which are transmitted on the assigned frequency. Those signals are supplied to a coincidence detector circuit 52 which compares the received pulse repetition rate code with stored code addresses to determine whether a wing station response may be required. If so, there is a lock-on in the lock logic detector 34, as described in U.S. Pat. No. 3,938,146. After lock on, the lock logic detector circuit 34 marks the marker gate wire 56 when a marker pulse is anticipated in order to enable the marker receiver circuit 54, which is substantially the inverse of the marker generator 38, to analyze the marker pulse, as it is received. When the marker receiver circuit 54 makes an identification of a reference station marker pulse which requires repeated signals, wire 58 is marked. The microprocessor 30 requires several redundant identifications and then accepts the station identification signals as being correct. The received pulses are also sent directly from receiver 50 to the marker receiver 54.

The marker receiver 54 extracts all of the marker information that was sent from the reference station, including the reference station identification. Thereafter, the station recognizes the need to respond to the ranging pulses following the recognized marker signal. The ranging pulses received at receiver 50 are retransmitted by transmitter 36 over antenna 55. Simultaneously, microprocessor 30 counts down the prescribed number of ranging pulses, via wire 48. After the predetermined number of pulses have been received, there is another shift in the station operating in the reference mode.

In operation, the receiver 50 receives pulses which the coincidence detector recognize as recurring at the pulse repetition rate that require a response. Since this recognition of ranging pulses comes from the pulse repetition rate, it is possible to program a single wing station to operate on a time basis which responds to many different reference stations, which are simultaneously operating at different pulse repetition rates.

To improve system responses, perhaps, 151-ranging pulses (for example) will be sent during a complete cycle. Then, wing station A could normally respond to only pulses 12–51, for example. Wing station B may normally respond to only pulses 62–101. Wing station C may normally respond to only the pulses 112–151. When one station replaces another as the station operating in the reference mode, the replaced station, which begins operating in the wing station mode, may respond to the pulses that otherwise would normally be responded to by the station moving into the reference mode. In the above example, wing station B may respond to pulses 12–51 while station A is the reference station mode. This way, there is no need to supply a wing station response capability which is wasted during that station's operations in the reference mode.

Moreover, after changing its mode of operation, each station must resynchronize itself and lock into the timing of the system operation. Therefore, there is a constant re-synchronization updating, which eliminates the problem of drifting. Also, if one station should malfunction, it would not cause a complete system failure because its changing role would lead to another and nonfaulty station taking over the wing mode repeater operation. There may be a gap in the stream of pulses which represents the malfunctioning station.

When the station of FIG. 7 is acting as a target receiver, the purpose is to find the time differentials shown in FIG. 2. The output of the target receiver 50 is coupled to a computer for making navigational computations responsive to such differentials. The target receiver merely receives signals and does not transmit them.

When in the target receiver mode, the main difference in circuit operation relates to the main gate and counter circuit 60. The system identification, lock on, etc., occurs as described above and in the Assignee's issued patents.

The differential timing information which the target receiver is to measure is contained in the time period between the recept of the reference station pulses and the wing station repeating of the reference station pulses. The preamble of the reference station contains simple reference pulses upon which the lock logic detector 34 "locks on". Once the marker pulses have stopped, a wing station begins to repeat the reference pulses. Each reference pulse is gated by the lock logic detector at gate 63 to start the main gate and counter 60. Following each lock logic detector gate, a look window 71 (a finite time interval after lock logic detector gate) gates the repeated wing station pulse at gate 65 and stops the main gate and counter 60. The resulting measured time interval is passed on to the microprocessor 30. Also, the microprocessor extracts any information that might be sent along with the ranging pulses, such as the information included in the marker pulse.

U.S. Pat. No. 4,398,198 gives the mathematics used to calculate the locations of the target receiver responsive to the timing differences between the pulses received over various paths. This mathematics may be programmed into any suitable computer which receives and responds to the output of the microprocessor.

It will be recalled that the shifting role of the various stations means that each is acting as the reference station at a different time. Therefore, the mobile target station may have moved and may not be at the exact same point for each set of readings that it receives. It is within the state of the art to "deskew" or to mathematically correct all readings to make them appear as if they had been taken at exactly the same instant in time.

Many things may cause errors to appear in any readings such as equipment aging, variable delay times, changing atmospheric conditions affecting transmission, and the like. With the described system, the non-systematic errors tend to cancel each other and to zero out. The more the readings, the more likely that a zeroing will occur. If these errors do not average, it means that the system contains systematic errors which are consistently off in a given direction. Therefore, there is a bias which is removed by a computer.

Using the above symbology, and assuming $K=$(twice the distance between stations); then, by Equation (3) $AB+BA=K_{AB}$. If an error at any station is indicated by E (e.g. $A_E$ is an error at station A), the readings may be written, as follows:

$$AB+B_E+BA+A_E=K_{AB}+E_{AB}$$

$$AC+C_E+CA+A_E=K_{AC}+E_{AC}$$

$$BC+C_E+CB+B_E=K_{BC}+E_{BC}$$

where $A_E$, $B_E$ and $C_E$ are the errors associated with each wing station, and $E_{AB}$, $E_{AC}$ and $E_{BC}$ are the composite errors.

After enough readings to average out random variables, known constants may be removed and these equations reduce to:

$$B_E+A_E=E_{AB}$$

$$C_E+A_E=E_{AC}$$

$$C_E+B_E=E_{BC}$$

Therefore, these formulas may be solved for each of the unknowns to detect the systematic errors in the individual stations.

In the system of U.S. Pat. No. 4,398,198, all stations transmit on a single frequency which is interrupted in a station identifying manner. On a worldwide basis, the same single frequency may be used everywhere with different rates of interruption to give different area codes. The vehicle entering an area detects the area code and the information relative to the individual stations may then be taken from any suitable library, such as a read only memory built into the microprocessor 30. After a suitable number of readings are taken, the on-board computer may easily subtract the systemic variations in the operations of each of the local stations.

Those who are skilled in the art will readily perceive how to modify the system. Therefore, the appended claims are to be construed to cover all equivalent structures which fall within the true scope and spirit of the invention.

What is claimed:

1. A radio ranging and navigation system comprising a plurality of stations at known geographical locations, an unlimited number of mobile receiver stations at independent locations, means in each of said known stations for enabling it to operate in a reference mode or a wing repeating mode, means for systematically shifting the modes of operation throughout said known stations, means responsive to a detection of signals sent after each of said shifting of said modes for detecting apparent distances between stations, means responsive to variations in said apparent distances for calculating systematic errors, and means responsive to said systematic errors for correcting said apparent distances to become true differential time measurements.

2. The system of claim 1 wherein the distance is known between the said known stations, and said means for calculating errors comprises means for adding the apparent distances or differential measurements between said two or more of said known stations found in at least two of said shifting modes, and subtracting the known distance from the added apparent distances to find electronic time delays in said system.

3. The system of claim 1 wherein at any given time one of said known stations operates in said reference mode, at least one of said mobile receivers operates in a passive mode, and all other known stations operate in said wing repeating mode, said means for systematically shifting the modes of operation successively switching said known stations operating in wing repeating mode to operation in a reference mode, whereby except for said mobile receiver, each of said known stations has a turn operating as a reference station, means at said mobile receiving station for measuring a time period beginning with receipt of a pulse transmitted directly from a reference station and ending with a receipt of a corresponding pulse repeated by a wing repeating station.

4. The system of claim 1 wherein all of said known stations transmit on a single frequency, each of said known sations pulsing said single frequency at its own individual rate to send ranging pulses at a system identifying pulse repetition rates, and means at a station operating in said reference mode for transmitting a marker pulse at the start of its reference mode of operation, and means at other stations responsive to said marker pulses to identify the station which is then operating in the reference mode.

5. The system of claim 4 and means for counting ranging pulses after said marker pulse, and means responsive to the countdown of a predetermined number of said ranging pulses for shifting the mode of known station operations.

6. A process of using radio ranging and navigation systems comprising the steps of:
   (a) locating at least three known stations in a geographical pattern;
   (b) transmitting signals from a first of said known stations (called a reference station) to the other of said two known stations;
   (c) repeating the transmitted pulses at said other two known stations (called wing repeating stations);
   (d) detecting a time period at a fourth station (called the mobile receiver) beginning with the receipt of the pulse transmitted in step (b) and ending with the receipt of a pulse repeated in step (c);
   (e) shifting the roles of said known stations so that the second of said known stations is operating in the reference mode and the remaining ones of said known stations are operating in the wing repeating mode and repeat step (d);
   (f) shifting the roles of said known stations so that each of said known stations has a turn in the reference mode while the remaining ones of said known stations are operating in the wing repeating mode and repeat step (d); and
   (g) adding the time periods of reciprocal pairs of said known stations when operating in the reference mode and in the wing repeater mode detected during steps (e) and (f) and comparing to the known distance between the pairs of known stations in order to find systematic errors in operations.

7. The process of claim 6 wherein step (b) comprises the steps of transmitting a station identifying marker pulses, transmitting a predetermined number of ranging pulses, and transmitting closing marker pulses.

8. The process of claim 7 wherein steps 6(e) and 6(f) comprises of shifting the roles of said known stations responsive to said marker pulses.

9. The process of claim 7 wherein steps 6(e) and 6(f) comprises the step of shifting the roles of said known stations responsive to a detection of an end of a reference sequence at said reference station of said known stations.

10. The process of claim 7 and the added step of transmitting said ranging pulses at a station identifying pulse repetition rate.

11. The process of claim 10 wherein said station identifying marker pulse comprises a pulse sent at a predetermined station identifying period in advance of its normal position in said repetition rate.

12. The process of claim 11 and the added step of sending data in a pulse period identified by said marker pulses.

13. The process of claim 12 wherein the detection of step 6(d) is at a mobile receiving station, and the added step of calculating the apparent times of pulse detections as if they were received while the mobile station was at a single geographic point in order to deskew the readings.

14. A radio ranging and navigation system comprising a plurality of fixed stations at known geographical locations, at least one station at an unknown location, each of said fixed stations being able to operate in a reference mode, and a wing mode, means for systematically shifting the modes of operation throughout said system so that the fixed stations take turns operating in the reference mode, means responsive to a detection of signals sent during said shifting modes for detecting apparent measurements between stations, means responsive to variations in said apparent measurements for calculating systematic errors, and means responsive to said systematic errors for correcting said apparent measurements to become true measurements.

15. The system of claim 14 wherein the distance is known between two of said fixed stations, and said means for calculating errors comprises means for adding the apparent measurements between said two fixed stations found in at least two of said shifting modes, and subtracting the known distance from the added measurements in order to find electronic time delays in said systems.

16. The system of claim 14 wherein at any given time one of said fixed stations operates in said reference mode, at least one station operating in a target mode, and all other fixed stations operate in said wing mode, said means for systematically shifting the modes of operation successively switching said fixed stations operating in wing mode to operation in a reference mode, whereby each of said fixed stations has a turn operating as a reference station, means at said target station for measuring a time period beginning with receipt of a pulse transmitted directly from a reference station and ending with a receipt of a corresponding pulse repeated by a wing station.

17. The system of claim 14 wherein all of said stations transmit on a single frequency, each of said stations interrupting said single frequency at its own individual rate to send ranging pulses at a station identifying pulse repetition rates, and means at a fixed station operating in said reference mode for transmitting a marker pulse at the start of its reference mode of operation, and means at other stations responsive to said marker pulses to identify the station which is then operating in the reference mode.

18. The system of claim 17 and means for counting ranging pulses after said marker pulse, and means responsive to the countdown of a predetermined number of said ranging pulses for shifting the mode of station operations.

* * * * *